April 20, 1943.   J. R. OLIVER   2,316,884
GAUGING MEANS FOR TAPING MACHINES
Filed Jan. 13, 1942   3 Sheets-Sheet 1

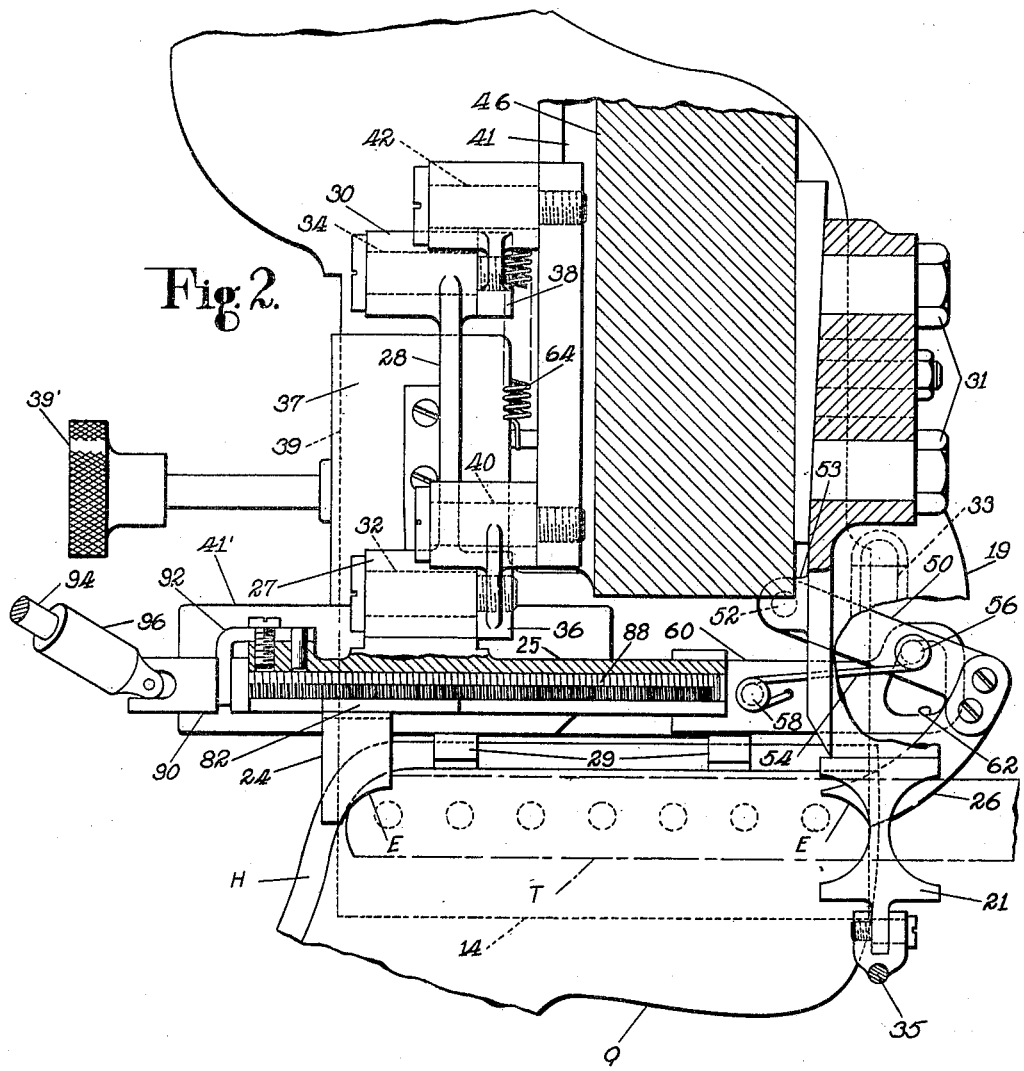
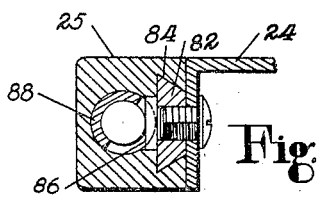

April 20, 1943.  J. R. OLIVER  2,316,884
GAUGING MEANS FOR TAPING MACHINES
Filed Jan. 13, 1942  3 Sheets-Sheet 3

INVENTOR
John R. Oliver
By his attorney

Patented Apr. 20, 1943

2,316,884

UNITED STATES PATENT OFFICE 2,316,884

GAUGING MEANS FOR TAPING MACHINES

John R. Oliver, Beverly, Mass., assignor to United Shoe Machinery Corporation, Flemington, N. J., a corporation of New Jersey Application January 13, 1942, Serial No. 426,585

11 Claims. (Cl. 12—51)

This invention relates to a taping machine for applying a reinforcing tape to parts of shoes, such as the eyelet row of a quarter, and is directed more particularly to improved gauging means for locating the work and reinforcing tape with respect to each other.

The machine is of the type disclosed in United States Letters Patent No. 2,233,424, granted March 4, 1941, on an application of J. E. McIntire. In the machine shown in the McIntire patent feeding means is provided for moving the leading end of a length of reinforcing tape to a predetermined point in a plane spaced above a work support upon which the work may be placed. Means is also provided for severing the length of tape and a presser is provided for pressing the severed length of tape against the work and causing it to adhere thereto. The length of tape required depends upon the type and size of the work to which it is to be applied. Accordingly, indexing means is provided for controlling the feeding means so that when the leading end of the tape is moved to the selected predetermined point a length of the tape sufficient for the taping operation is provided. In the aforesaid machine the work was located beneath the tape by means of an end gauge and back gauges against which the work was placed.

In some shoe factories the quarter, for example, is turned over along the eyelet row to provide a hem-like edge. The depth of the "hem" varies considerably according to the amount of material turned over and this variation is particularly evident at the curved end of the eyelet row. When the curved end of the tape is to be applied to a quarter having a hemmed edge of this character, the end gauge referred to above cannot be depended upon accurately to locate the work in the correct longitudinal position below the tape because of the fact that the inner curved edge of the hem is not a fixed distance from the end gauge.

It is an object of the present invention, therefore, to provide improved gauging means to facilitate rapid and accurate location of the longitudinal position of the work upon the work support.

In accordance with the preceding object, the invention resides in an end gauge to facilitate alining the work longitudinally of the tape, the gauge being adjustable simultaneously with the adjustment of the means for controlling the position of the leading end of the tape.

The details of the gauging means and the mechanism for operating the same will now be described with reference to the accompanying drawings, in which Fig. 1 is a front elevation of the lower portion of the machine, partly broken away to show the improved gauging means and operating means therefor;

Fig. 2 is a plan view on the line II—II of Fig. 1, showing the gauge operating means partly in section;

Fig. 3 is a detail of the means for moving the left-hand end gauge;

Figure 1:
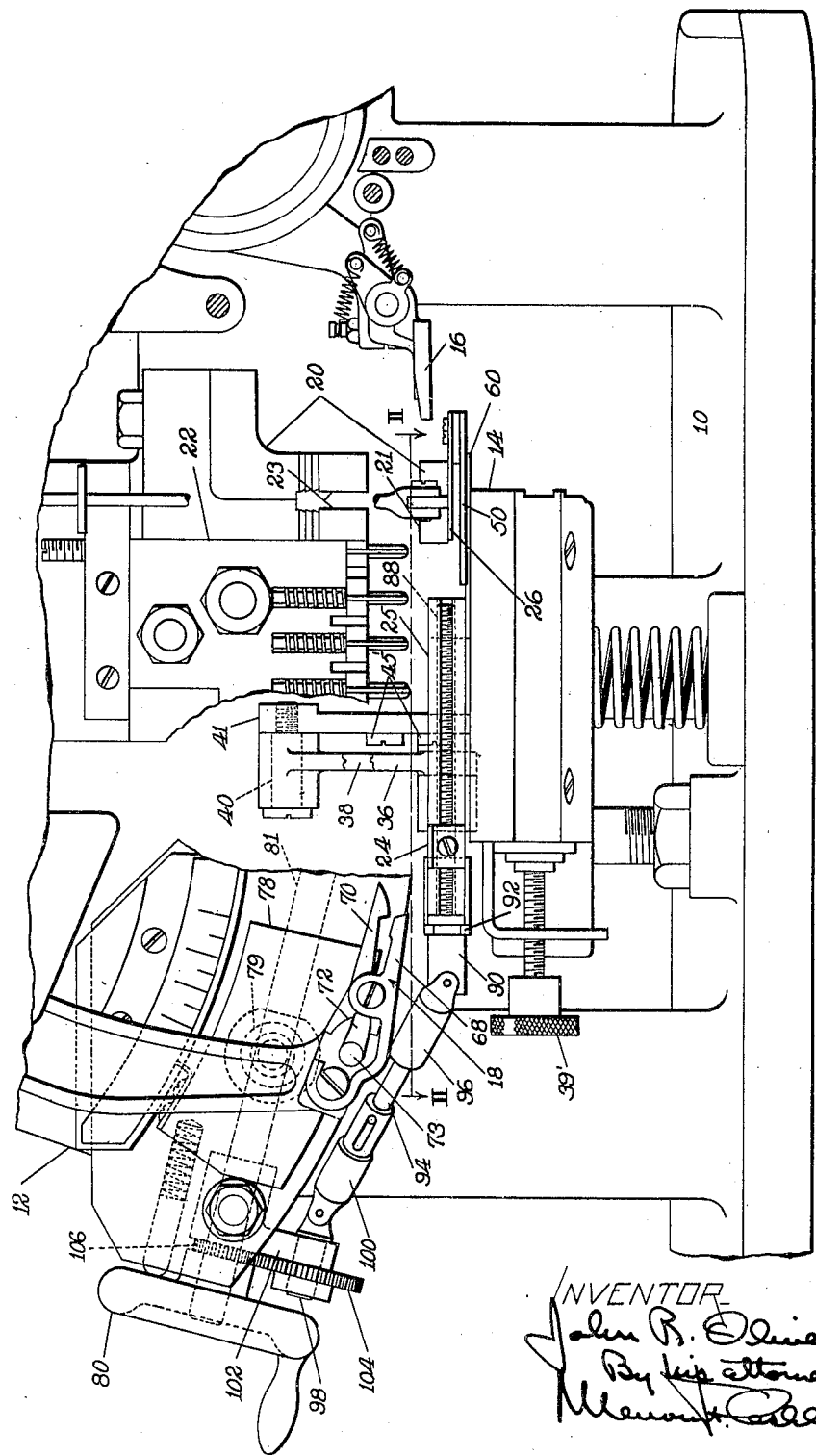

Referring to Fig. 1, the machine comprises in general a base 10, a frame 12 rising from the base and upon which the operative parts are mounted, these parts consisting of a work support 14, a pair of tape transferring means 16 and 18, a severing means 20, and a presser 22 for pressing a severed length of tape into contact with a piece of work to be reinforced which rests on the work support 14.

Figures 5, 6:
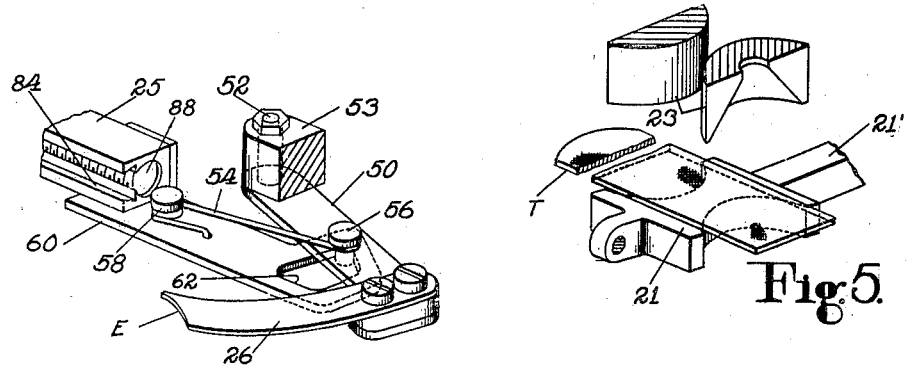
Fig. 5 is a detail of the tape severing means.
Fig. 6 is a detail of the end gauge employed at the end adjacent to the tape severing means.

In the McIntire machine referred to above the work, for example, a quarter Q, was placed upon the work support and moved beneath the tape T which was held above the work support, the proper positioning of the work beneath the tape being obtained by moving the edge of the work into engagement with an end gauge (not shown herein) and a pair of back gauges, a corresponding pair of gauges 29 being shown at the rear of the work support 14 in Fig. 2. As the presser 22 descended, the severing means 20, consisting of a fixed die 21 and co-operating movable punches 23, severed a predetermined length of tape from a source of tape, whereupon the severed piece fell upon the work and was caused to adhere thereto by the pressure of the presser 22. The die 21 is removably fixed to the frame of the machine by a bracket 19, the bracket being adjustably attached to the frame by bolts 31. To this end, a socket 33 is formed in the bracket for the reception of an extension 21' integral with the die 21. The extension is locked in the socket by a setscrew (not shown). A rod 35 rises vertically from the free end of the die (Fig. 4) and serves as a guard to prevent the operator from putting his fingers in the path of the descending cutter. In the aforesaid machine the cutting edges of the punch and die were formed to make a curved cut at the one corner of the leading and trailing ends of the tape. In the present case the cutting edges of the punch and die have been modified (Fig. 5) to make curved cuts at both corners of the leading and trailing ends of the tape.

Some manufacturers finish the edge of a quarter along the eyelet row, as shown in Fig. 2, by turning it over to form a narrow hem H. The depth of the hem varies considerably, particularly at the curved or bent end of the eyelet row. Consequently, when the work is located below the tape by placing it against an end gauge such as formerly employed in the McIntire machine, the leading end of the tape, that is, the curved end thereof, which is supposed to lie within the curved edge of the hem at the bent end of the eyelet row, may overlap the edge of the hem slightly. This produces an unsightly bulge and, accordingly, it is desired to provide end gauging means which will assist the operator in lining up the curved end of the tape with the curved edge of the hem. To this end, a pair of end gauges 24 and 26 (Fig. 2) are disposed between the plane of the work support and the plane of the tape (Fig. 1). The end gauge 24 is employed for left-hand quarters, as shown in Fig. 2, and the end gauge 26 is employed for right-hand quarters. The front edges E of the end gauges are curved, to approximate the curved or rounded ends of the tape. When the machine is in use, the operator, standing in front of the machine and looking down toward the work support, sees the edge E of the end gauge 24, for example, and the work support under this edge as if they were in one plane. By moving the work, that is, a quarter, inwardly along the work support until the rear edge of the work strikes the back gauges 29 and then shifting the work longitudinally until the curved edge of the hem is alined with the curved edge E of the end gauge 24 as it appears on the surface of the work support, he thereby alines the edge of the hem vertically with the curved end of the tape disposed above the work support. To avoid the confusion of having the edges E of the gauges directly above the rear curved edges of the tape in the plan view of Fig. 2, these edges E are shown as if in advance of the rear edges of the tape. The representation of the edges E in this position is exactly what the operator sees when he stands at the front of the machine and looks down toward the work support. Since the distance between the edge E of the end gauge and the work support is very small in comparison to the distance from the edge E of the gauge to the operator's eye, a great change in the position from which the operator views the edge E of the end gauge will make only a very small variation in the alinement of the work and the tape, the variation, in fact, being so small as to be negligible.

The end gauges 24 and 26 are held in position above the work support while the presser head 22 is raised and the work is being placed on the work support. The end gauges, however, must be retracted from the work support before the presser comes down into contact therewith and, accordingly, means is provided which is operable by the reciprocation of the presser to retract the end gauges. To this end, the end gauge 24 is mounted for movement with a member 25 (Figs. 2 and 3) which extends along the rear of the work support 14 and above the same, the member having a boss 27 formed integral with the rear side thereof. An arm 28 formed integral with the boss 27 extends rearwardly thereof in a horizontal plane (Figs. 2 and 4) and is provided at its opposite end with a boss 30 corresponding to the boss 27. A pair of screws 32 and 34 are passed through the bosses 27 and 30 and provide means for suspending the bosses, and consequently the member 25, from the ends of a pair of parallel links 36 and 38. The links 36 and 38 are pivotally supported at their upper ends upon a pair of screws 40 and 42 which are threaded into a bracket 41 fastened by screws 45' to a rib 46 which depends from the frame 12. The link 36 is provided with an integral finger 48 (Fig. 4) the free end of which projects forwardly into the path of a portion of the reciprocating presser 22. It is apparent, therefore, that as the presser 22 moves downwardly the finger 48 is turned in a counterclockwise direction, as shown by the dotted arrow in Fig. 4. This, in turn, swings the links 36 and 38 about their pivot points and moves the bosses 27 and 30 and the member 25 carried by them rearwardly in a horizontal plane to retract the end gauge 24 from the work support. The end gauge 26 is not carried directly by the member 25 although it is withdrawn or retracted from the work by the movement of the member 25. The gauge 26 (Fig. 6) must not be moved longitudinally of the work support since the end of the tape at this end of the work support is always in the same position because of the fact that the tape is severed at this point by the severing means 20. Accordingly, the end gauge 26 is fastened to an arm 50, the arm 50 being pivotally fastened at 52 to a boss 53 extending laterally from the bracket 19 which carries the fixed portion 21 of the severing means (Fig. 2). A spring 54 fastened at one end to a pin 56 inserted in the arm 50 and at its opposite end to a pin 58 inserted in an extension 60 secured to the member 25 normally acts to turn the arm 50 about its pivot point in a counterclockwise direction, as seen in Fig. 2, to hold the end gauge 26 in a retracted position. The extension 60 fixed to the member 25 has at its free end an enlarged opening 62 into which the lower end of the pin 56 extends. When the member 25 which carries the end gauge 24 is in its operating position, that is, in its forward position, the rear edge of the opening 62 comes into contact with the pin 56 and turns the arm 50 in a clockwise direction, as seen in Fig. 2, thereby swinging the end gauge 26 into its operative position. When the member 25 is retracted, its travel is of such extent that if a clearance, that is, the enlarged opening 62, were not provided, the arm 50 would be swung back into contact with a part of the frame and perhaps damage the mechanism. The clearance provided permits the member 25 to retract its full distance without positively forcing the arm 50 beyond the point at which it comes in contact with the frame. The member 25 is urged forwardly, so that the end gauges 24 and 26 are in position over the work support, by a coil spring 64 (Fig. 2) attached at one end to the lower end of the link 38 and at its opposite end to a pin on the bracket 41. To provide for a possible failure of this spring, a pin 66 (Fig. 4) is inserted in the rear side of the presser in such a position that as the presser moves up, if the spring does not operate to move the member 25 forwardly, the end of the pin 66 will come into contact with the free end of the finger 48 and thereby positively swing the member 25 forwardly.

The length of tape to be applied to the work will vary with the type of work and the size of the piece to which it is to be applied. Accordingly, the tape transferring means, one element of which consists of a pair of jaws 68 and 70 (Fig. 1) for gripping the leading end of the tape and moving it in a plane above the work on the work support, is controlled by an indexing device to cause the tape transferring means to release the end of the tape at a predetermined point in its travel, thereby providing means for regulating the length of tape drawn above the work support. The jaws 68 and 70 reciprocate, as disclosed in the McIntire patent referred to above, and in their movement to the left, as seen in Fig. 1, during which the tape is moved above the work support, the jaw 70 is moved away from the jaw 68 to release the end of the tape. This is accomplished briefly, as disclosed in the aforementioned patent, by a dog 72 which, when turned in a clockwise direction, will strike the tail end of the jaw 70 and move the jaw 70 away from the jaw 68. The dog is fastened to the end of a spindle 73, the opposite end of the spindle having secured thereto a lug (not shown) which is caused, during its movement with the jaws toward the left, to turn the spindle 73, and consequently the dog 72, in a clockwise direction to open the jaws. The aforesaid lug is actuated by an adjustable trip block 78 which is fixed to a stud 79, the latter being threaded on a screw 81 carried by the frame of the machine. The trip block 78 lies in line with the path of movement of the tape transferring means 18 so that as the tape transferring means 18 moves toward the left the lug will strike the lower front edge of the trip block at a given point in its travel. It is evident, therefore, that the point at which the tape transferring means 18 will release the tape will depend upon the position of the trip block 78. The position of the trip block may readily be changed to vary the length of tape drawn off, by rotation of the screw 81 to which a hand wheel 80 is fixed for this purpose. The aforesaid mechanism, that is, the stud 79, screw 81, wheel 80, and trip block 78, constitutes the indexing mechanism. It is obvious that if the length of the tape is to be varied it will be necessary to shift the position of the end gauge 24 to correspond to the change in the length of the tape. Accordingly, means is provided for moving the end gauge 24 longitudinally of the member 25, and this means is coupled with the means for moving the trip block 78 so that the gauge 24 is moved simultaneously with the movement of the trip block. To this end, the end gauge 24 (Fig. 3) is fastened to a dovetailed gib 82 which slides in a dovetailed slot 84 formed in the front face of the member 25. Teeth 86 are formed on the back surface of the gib 82 and mesh with a screw 88 which extends longitudinally of the member 25. The end of the screw is provided with a head 90 (Fig. 2) having a circumferential groove formed therein for the reception of a retaining fork 92 which is fastened to the member 25. The retaining fork 92 prevents longitudinal movement of the screw in the member 25. The rotation of the screw is accomplished by an extensible shaft 94 which is pivotally fastened at one end to the screw by a coupling 96 and at its opposite end to a stub shaft 98 (Fig. 1) by a coupling 100. The stub shaft 98 is carried by a bracket 102 which is fastened to the frame of the machine adjacent to the screw 81. A gear 104 is mounted on the stub shaft and meshes with a gear 106 formed on the hub of the hand wheel 80. Accordingly, when the hand wheel 80 is turned to change the position of the trip block 78, the screw 88 is simultaneously turned to change the position of the gauge 24 a corresponding amount.

The variation in the depth of the hem along the straight run of the eyelet row does not cause trouble because there is no need to have the edge of the tape coincide exactly with the inner edge of the hem along the straight run. Consequently, the back gauges may be set so that even in an extreme case the edge of the tape will lie within the inner edge of the hem. This cannot be done in the case of the ends of the tape because the reinforcing tape must be carried clear up into the corner of the curved ends to insure a proper foundation for the eyelet fastenings.

Figure 4:
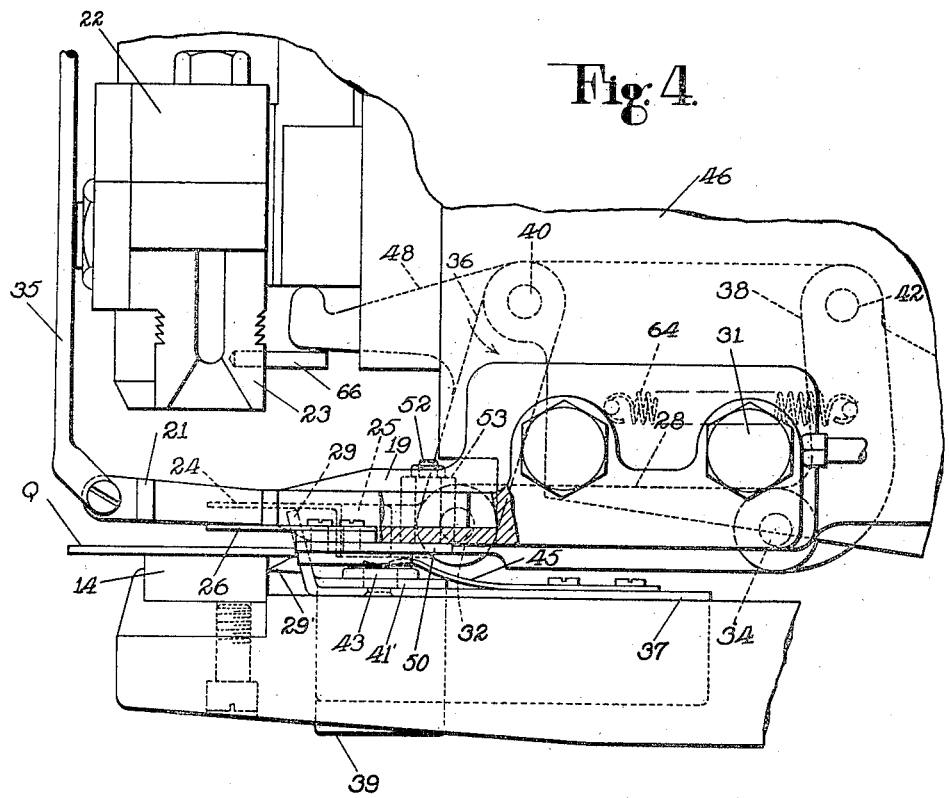
Fig. 4 is an end elevation, as seen from the right end of Fig. 1, showing the work support and the back gauges.

The back gauges 29 are similar to those disclosed in the McIntire patent. One of the gauges is carried by an L-shaped plate 37 (Fig. 2) having a depending flange 39. A slot is formed in the flange and a screw 39' is passed therethrough and provides means for adjusting the plate longitudinally to move the gauges to and from the work support. The other gauge is carried by another plate 41' which is slidably mounted on the L-shaped plate 37 between the latter and a cover plate 43 so that the distance between the gauges may be varied. The cover plate 43 is loosely pinned to the plate 37, the pins extending through a slot formed in the plate 41', and a spring finger 45 is secured to the L-shaped plate so that its free end bears against the cover plate, thereby frictionally holding the cover plate in contact with the plate 41'. The form of the gauges has been modified to improve their gauging operation. It was found that during exceedingly dry periods, or when the work received was unusually dry, there was a tendency for the work to curl up at the rear edge and, as a result, when the operator pushed the work inwardly against the back gauges 29 the curled edge slid along the surfaces of the gauges allowing the work to move in too far so that the tape when applied was displaced inwardly of the eyelet row. Accordingly, the back gauges 29 in the present instance have been set so that the front faces thereof slope forwardly (Fig. 4). The sloping surface tends to hold the curled edge down and, in fact, to straighten it out as the work is pushed inwardly into contact with the back gauges. It was also found that during damp periods, or when the work was exceedingly moist, the edge thereof tended to droop and, as a result, the work when moved into engagement with the gauges would be too far toward the rear. To overcome this condition, a spur 29' (Fig. 4) is struck from the front face of each gauge, the top portion of the base of the spur being substantially on a level with the work support and the surface thereof sloping downwardly to the tip below the work support. Accordingly, when a piece of work with a drooping edge is placed on the work support, the edge will be raised by the sloping surfaces of the spurs to a point on a level with the work support.

In using the machine equipped with the end gauges 24 and 26, the operator places the work, which may consist of a quarter, upon the work support and moves it toward the back of the support beneath the tape until its rear edge strikes the back gauges 29 which are positioned along the rear edge of the work support. In order to aline the work with the tape so that when the tape is severed and brought down into contact with the work, the curved end of the tape will lie within the curved edge of the hem H, the operator sights down upon the edge E of the gauge 24 or 26, as the case may be, and lines up the curved end of the tape with the edge E of the end gauge. When it is necessary to shorten or lengthen the tape, the end gauge 24 must be moved to a position adjacent to the end of the tape, and this is accomplished automatically by rotation of the hand wheel 80 which controls the position at which the jaws release the tape. When tape is to be applied to a right-hand quarter, the gauge 26 is employed and, since the severing means is stationary, this gauge is not adjustable relative to the severing means.

Having described my invention, what I claim as new and desire to secure by Letters Patent of the United States is:

1. In a taping machine, a work support, tape transferring means for moving the leading end of the tape to a predetermined point with respect to the work support, control means for adjustably determining said predetermined point, an adjustable gauge to locate the work on the work support, and means simultaneously to adjust said control means and said gauge means.

2. In a taping machine, a work support, tape transferring means for moving a predetermined length of tape above the work on the work support, control means for causing the tape transferring means to release the leading end of the tape at a given point in its movement in accordance with the length of tape required for the taping operation, and a movable end gauge adjacent to the point at which the tape transferring means releases the tape to facilitate alining a given point on the work with respect to said end of the tape, said control means being connected to said end gauge automatically to change the position of said end gauge to maintain it at the point of release for any given length of tape.

3. In a taping machine, a work support, tape transferring means for moving the leading end of the tape to a predetermined point above the work on the support, control means for adjustably determining said predetermined point, a movable end gauge to facilitate alining a given point on the work with respect to said end of the tape, means for supporting the gauge adjacent to said predetermined point, and means for moving the end gauge along the gauge support, said means being operable by the adjustment of the control means.

4. In a taping machine, a work support, tape transferring means for moving the leading end of the tape to a predetermined point above the work on the support, control means for adjustably determining said predetermined point, a movable end gauge to facilitate alining a given point on the work with respect to said end of the tape, means for supporting the end gauge adjacent to said predetermined point, means for moving the end gauge on the gauge support longitudinally of the work support, and means operable by the adjustment of the control means to actuate said means on the gauge support to move the end gauge an amount corresponding to the movement of the control means.

5. In a taping machine, a work support, tape transferring means for moving a predetermined length of tape above the work on the support, adjustable means for causing the tape transferring means to release the leading end of the tape at a given point in its movement in accordance with the length of tape required for the taping operation, a movable end gauge to facilitate alining a given point on the work with respect to said end of the tape, means for supporting the gauge adjacent to the point at which the tape transferring means releases the tape, and a screw on the gauge support for moving the gauge longitudinally thereof with respect to the work support, the adjustment of the adjustable means actuating the screw to move the gauge an amount corresponding to the movement of the adjustable means.

6. In a taping machine, a work support, tape transferring means for moving a predetermined length of tape above the work on the support, adjustable means movable along the path of the tape transferring means for causing said means to release the leading end of the tape at a given point in its movement in accordance with the length of the tape required for the taping operation, a movable gauge to facilitate alining a given point on the work with respect to said end of the tape, means for supporting the gauge adjacent to the point at which the tape transferring means releases the tape, a screw on the gauge support for moving the gauge longitudinally thereof with respect to the work support, and means connecting the adjustable means with said screw whereby adjustment of said adjustable means along the path of the tape transferring means simultaneously moves the gauge a corresponding amount.

7. In a taping machine a work support, tape transferring means for moving a predetermined length of tape above the work on the support, adjustable means movable along the path of the movement of the tape transferring means for causing the tape transferring means to release the leading end of the tape at a given point in its movement in accordance with the length of tape required for the taping operation, a movable gauge to facilitate alining a given point on the work with respect to said end of the tape, means for slidably supporting said gauge adjacent to the point at which the tape transferring means releases the tape, a screw on said gauge support for moving the gauge longitudinally of the work support, and means for connecting said screw with the adjustable means for rotation, thereby to move the gauge along the path of movement of the tape transferring means an amount corresponding to the movement of the adjustable means, said means including a shaft connected at one end to the screw and at its opposite end to a stub shaft, a gear on said stub shaft, and a gear associated with said adjustable means for rotation thereby, said gears meshing.

8. In a taping machine for applying a length of reinforcing tape to an eyelet row of a quarter, a work support for the quarter, jaws for gripping the leading end of the tape and moving a predetermined length thereof above the quarter on the support, an adjustable trip movable along the path of movement of the jaws and operable to cause the jaws to release the end of the tape at said predetermined point, and an end gauge to facilitate alining the end of the eyelet row with the end of the tape, the adjustment of said adjustable trip along the path of movement of the jaws being operable simultaneously to change the position of the gauge a corresponding amount.

9. In a taping machine, a work support, tape transferring means for moving the leading end of the tape to a predetermined point with respect to the work support, control means for adjustably determining said predetermined point, a gauge to locate the work on the work support, means connecting the gauge with the control means for simultaneous adjustment with said control means, a presser for pressing the tape against the work, and means for moving the gauge means out of the path of the presser without disturbing the operativeness of the connection to the gauge adjusting means.

10. In a taping machine, a work support, tape transferring means for moving a predetermined length of tape above the work on the work support, tape severing means, work gauge means adjacent to the work support in the path of the severing means and in alinement therewith, said work gauge means having an edge along which the operator may sight to facilitate locating the work at a predetermined point on the work support with respect to the severing means, and means for moving the work gauge means out of the path of the severing means.

11. In a taping machine, a work support, tape severing means, feeding means for projecting a length of tape beyond the severing means a variable amount, a presser for pressing the tape against the work, a gauge at the leading end of the tape, adjustable means for controlling the feeding means and gauge simultaneously, a nonadjustable gauge adjacent to the severing means, and means to move the gauges out of the path of the presser without interfering with the adjustable means.

JOHN R. OLIVER.